Patented Apr. 5, 1932

1,851,969

UNITED STATES PATENT OFFICE

WALTHER ALBRECHT, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

MONODIAZO COMPOUNDS OF 1.4-DIAMINO-2-HALOGEN- OR 2.3-HALOGEN-ANTHRAQUINONES AND A PROCESS OF PREPARING THEM

No Drawing. Application filed July 15, 1930, Serial No. 468,209, and in Germany July 17, 1929.

The present invention relates to monodiazo compounds of 1.4-diamino-2-halogen- or 2.3-halogen-anthraquinones and a process of preparing them.

I have found that 1.4-diamino-anthraquinones of the following general formula:

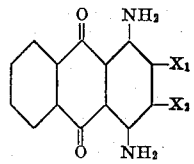

wherein $X_1$ stands for halogen and $X_2$ for hydrogen or halogen are capable of reacting, in the presence of a mineral acid, with nitrous acid or another diazotizing agent with the formation of monodiazo compounds. Despite the fact that the starting materials contain two amino groups, solely monodiazo compounds are formed by the present process, even if an excess of nitrite is used.

The halogenated aminodiazoanthraquinones obtainable according to the present process are valuable intermediate products. They can be converted into other valuable products by one of the usual methods, for instance by Sandmeyer's reaction.

The following examples serve to illustrate the invention, but they are not intended to limit it thereto, the parts being by weight:

(1) 20 parts of 1.4-diamino-2.3-dichloranthraquinone are dissolved in 200 parts of sulfuric acid of 96% strength and diazotized by addition of 8 parts of sodium nitrite or the corresponding quantity of nitrosylsulfuric acid. 1 mol of nitrous acid is consumed thereby. By pouring the solution on 400 parts of ice, the sulfate of the diazo compound of the following formula:

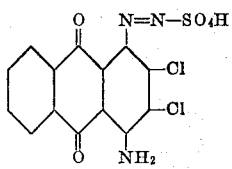

is separated. It forms brownish-yellow prisms which dissolve in water to a yellow solution. The diazo compound dissolves in concentrated sulfuric acid with a yellow coloration which on addition of formaldehyde turns violet-red. When heated, the crystals swell up and deflagrate. The diazotization may also be carried out in organic acids, for instance in glacial acetic acid, by means of amylnitrite.

The following examples illustrate the preparation of other valuable products by way of the monodiazo compound without comprising all possibilities for such preparation:

(2) 32 parts of 1.4-diamino-2-bromanthraquinone are dissolved in ten times their weight of sulfuric acid of 96% strength and diazotized by addition of 8 parts of sodium nitrite. The solution is given into 1000 parts of ice water and 1000 parts of alcohol and a solution of 50 parts of copper sulfate in 200 parts of water are added. The solution is stirred from time to time while being allowed to stand first in the cold and subsequently being heated to 60° C. until the evolution of nitrogen ceases. After filtering by suction, there is obtained a mixture of 1-amino-2-bromanthraquinone and 1-amino-3-bromanthraquinone containing 26,9% of bromine.

(3) 20 parts of 1.4-diamino-2.3-dichloranthraquinone are diazotized as described in Example 1. While cooling, 200 parts of ice, 100 parts of alcohol and 3.5 parts of copper sulfate, dissolved in 14 parts of water, are entered into the diazo solution. When the reaction is finished, the 1-amino-2.3-dichloranthraquinone is filtered by suction. It forms, when crystallized from monochlorobenzene, yellowish-brown needles which melt at 219° C.–221° C. and contain 24,1% of chlorine.

(4) 20 parts of 1.4-diamino-2.3-dichloranthraquinone are diazotized as described in Example 1. The diazo compound is filtered by suction and entered into a solution of 20 parts of cuprous chloride in 200 parts of concentrated hydrochloric acid. The solution is stirred for some time at room temperature, heated on the waterbath and filtered by suction when the reaction is finished. The 1-amino-2.3.4-trichloranthraquinone thus obtained crystallizes from glacial acetic acid in the form of brownish yellow needles which melt at 244° C. and contain 31,1% of chlorine.

(5) 20 parts of 1.4-diamino-2.3-dichloranthraquinone are diazotized as described in Example 1. The diazo solution is poured into 400 parts of water, filtered by suction and then entered into a solution of potassium cuprous cyanide of 50° C. to 60° C. consisting of 35 parts of copper sulfate and 38 parts of potassium cyanide. After one hour's stirring at room temperature, the solution is boiled until the reaction is finished. The 1-amino-2.3-dichloranthraquinone - 4 - nitrile thus obtained is filtered by suction and recrystallized from nitrobenzene. It forms yellowish-brown needles having a bronze-like shimmer which melt at 301° C. to 303° C. and contain 21,7% of chlorine and 8,5% of nitrogen.

(6) 20 parts of 1.4-diamino-2.3-dichloranthraquinone are diazotized as described in Example 1 and precipitated as diazo-sulfate. The diazo compound is given into a boiling suspension or solution of 14 parts of cuprous chloride in 2000 parts of water. After boiling for a short time it is filtered by suction and the copper salts are washed out by means of hydrochloric acid. The 4.4'-diamino-2.2'-3.3'-tetrachloro-1.1'-dianthraquinonyl of the following formula:

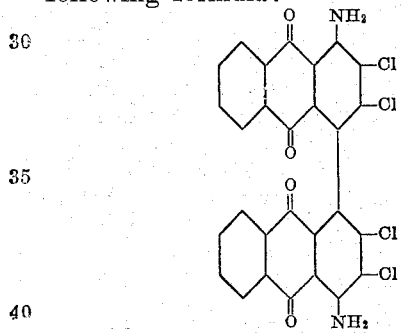

can be purified by crystallization from nitrobenzene. It forms small reddish-brown brilliant leaflets which melt with decomposition at 380° C.

I claim:

1. The process which comprises causing a compound of the following general formula:

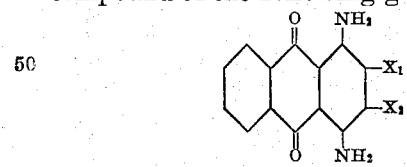

wherein $X_1$ stands for halogen and $X_2$ for hydrogen or halogen to be reacted upon with sodium nitrite in the presence of a strong mineral acid.

2. The process which comprises treating a compound of the following general formula:

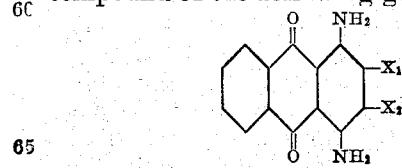

wherein $X_1$ stands for chlorine or bromine and $X_2$ for hydrogen or chlorine with sodium nitrite in the presence of a strong mineral acid.

3. The process which comprises treating 1.4-diamino-2.3-dichloranthraquinone with sodium nitrite in the presence of a strong mineral acid.

4. As new products, monodiazo compounds of the compounds of the following general formula:

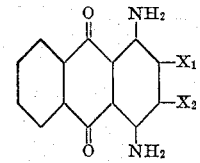

wherein $X_1$ stands for halogen and $X_2$ for hydrogen or halogen.

5. As new products, monodiazo compounds of the following general formula:

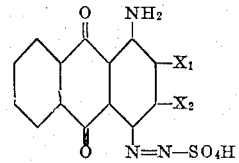

wherein $X_1$ stands for chlorine or bromine, $X_2$ for hydrogen or chlorine.

6. As a new product, 1-amino-2.3-dichloranthraquinone - 4 - diazoniumsulfate which forms brownish-yellow prisms dissolving in water to a yellow solution and dissolving in concentrated sulfuric acid to a yellow solution which turns violet-red by addition of formaldehyde.

In testimony whereof, I affix my signature.

WALTHER ALBRECHT.